United States Patent [19]
Myers

[11] Patent Number: 4,669,822
[45] Date of Patent: Jun. 2, 1987

[54] APPARATUS AND METHOD PERMITTING NON-INTRUSIVE OBSERVATION OF ENCASED INDICATORS

[76] Inventor: Austin Myers, P.O. Box 51, Pine, Ariz. 85544

[21] Appl. No.: 619,284

[22] Filed: Jun. 11, 1984

[51] Int. Cl.$^4$ ............................................. G02B 27/02
[52] U.S. Cl. .................................................. 350/114
[58] Field of Search ................ 350/114, 115, 244, 579

[56] References Cited

U.S. PATENT DOCUMENTS

| | | | |
|---|---|---|---|
| 2,919,622 | 1/1960 | Hensoldt | 350/579 |
| 4,215,916 | 8/1980 | Bell et al. | 350/114 |
| 4,515,437 | 5/1985 | Story | 350/114 |

FOREIGN PATENT DOCUMENTS 1181845 2/1970 United Kingdom ................ 350/114

*Primary Examiner*—John K. Corbin
*Assistant Examiner*—Vincent J. Lemmo
*Attorney, Agent, or Firm*—Harry M. Weiss & Associates

[57] ABSTRACT

An apparatus and method permitting non-intrusive observation from an exterior environment of an indicator encased within an interior environment. A lensholder retaining a magnifying lens is secured to the indicator face of a fluid meter while a meter cover thereover has a sighting plug in alignment therewith. A sighting duct engages the sighting plug at a distal portion thereof allowing a user to remotely view the indicator at a proximal portion of the sighting duct.

16 Claims, 8 Drawing Figures

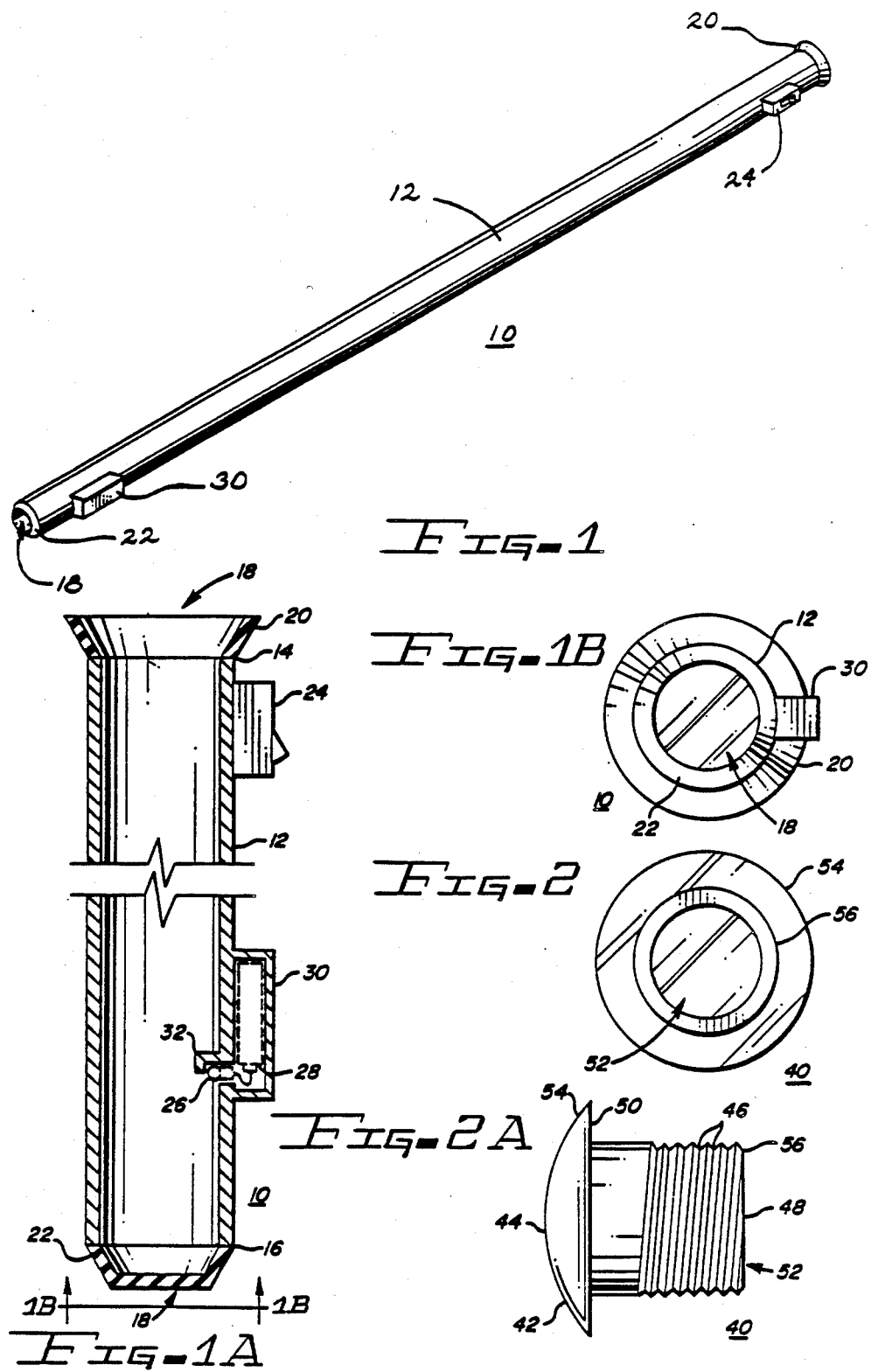

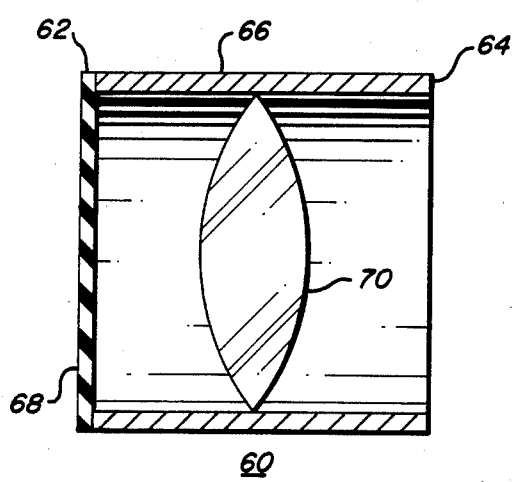
Fig-3
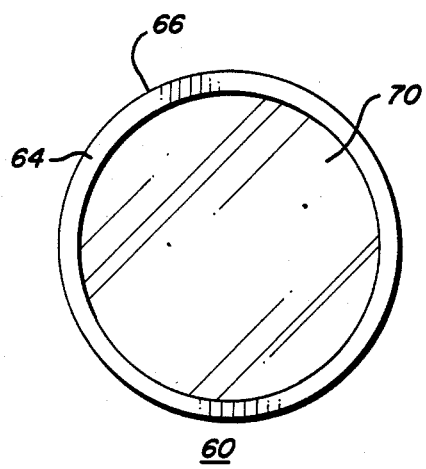
Fig-3A
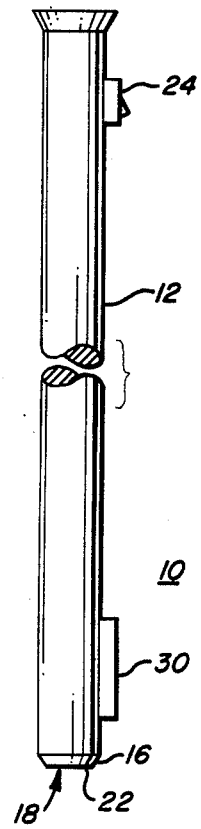
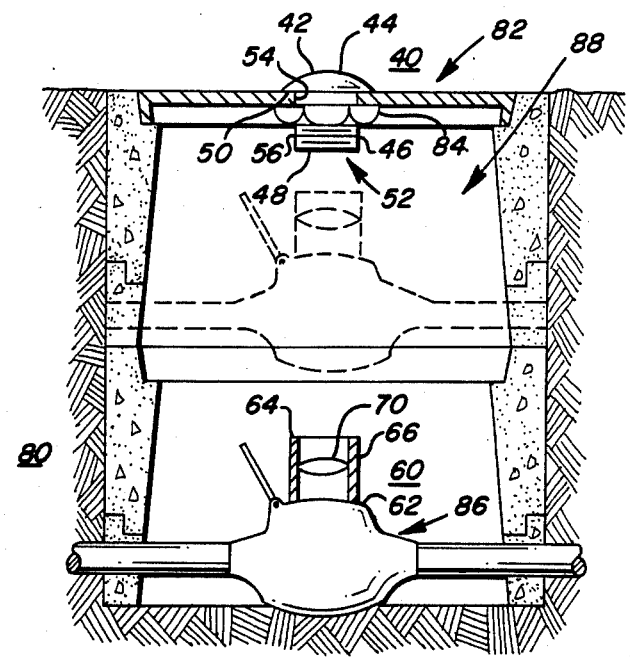
Fig-4

APPARATUS AND METHOD PERMITTING NON-INTRUSIVE OBSERVATION OF ENCASED INDICATORS

BACKGROUND OF THE INVENTION

The present invention relates, in general, to the field of apparati and methods permitting non-intrusive observation of encased indicators. More particularly, the present invention relates to a portable and lightweight apparatus and method for reading fluid flow measuring equipment, for instance, buried water meters.

Water meters and other liquid and gaseous fluid flow indicators must, of course, be periodically examined to determine the volume or rate of such fluid or gas which has been metered therethrough. Due to the fact that conduits for most such substances are buried, it follows that in most instances, the meters are likewised subterraneanly disposed.

As a result, these meters, incorporating one or more indicators of a volume or rate of fluid flow, are generally encased in a covered pit so as not to present a danger as a pitfall and to prevent tampering, etc. Therefore, the cover to such meter pit must usually be removed to observe the meter indicators with a concomitant expenditure of time and effort in its removal and replacement. Such covers are of necessity heavy and require stooping or prying to manipulate them thereby exposing the would-be viewer to the possibility of back strain. Moreover, the indicators therein are, for reasons of space and economy, relatively small, generally requiring proximate viewing to ascertain the correct indication thereof. Furthermore, depending on the indigenous flora and fauna, such intimate inspection can subject the viewer to the ravages of toxic plants or venomous reptiles and insects.

To this end, there have been heretofore described various meter reading systems. Exemplary systems include U.S. Pat. No. 2,107,720 issued Feb. 8, 1938 to Louis A. Swander for a Dial Cover for Water Meters. This patent describes a water meter specifically constructed with a lens over the dial to facilitate reading of the meter indicators. However, when used in conjunction with a buried meter having a cover thereover the cover on the well must be manually removed in order to view the meter indicator. Moreover, the dial cover therein described must be specifically manufactured for each meter with which it is utilized. Still further, despite the magnifying properties of the dial cover for the water meter closure, inspection of the meter would be nonetheless required due to the removal and replacement of the cover. Additionally, the system therein described cannot be read at night or under poor lighting conditions without an external light source.

U.S. Pat. No. 2,413,252 issued Dec. 24, 1946 to Richard E. Smith describes a transparent lid having an integral lens for utilization in reading a buried meter. Although, not requiring removal of the lid as in the aforementioned Swander patent, the system described in Smith nonetheless requires a close inspection of the plastic lid to view the meter indicators thus requiring stooping to do so. Similarly, the transparent lid must be specifically manufactured for the multitude of various meter configurations and pit dimensions encountered. Also as above described with respect to Swander, the Smith system cannot be read under poor ambient light conditions without an external light source.

U.S. Pat. No. 3,499,698 issued Mar. 10, 1970 to Joseph F. Malys for a meter reading tube describes a viewing tube incorporating a lens system for viewing a meter dial within a house from an external point. The viewing tube therein described as intended to be incorporated into the house wall itself and the device therein described remains fixed in position. This nonportable apparatus also relies on ambient light to provide illumination of the meter face and does not contemplate a reading of subterranean or submerged fluid metering devices.

U.S. Pat. No. 4,215,916 issued Aug. 5, 1980 to Billy W. Bell et al. describes a submerged, or under water meter reading device. The apparatus therein described comprises a pair of telescoping tubes which are extendable to draw in water from over a meter face such that the water thus drawn can be thereafter expelled to clean debris therefrom. As the device therein described is designed for submerged, or underwater meters, the meter reading scope shown is of necessity relatively heavy, bulky and needlessly complex for the majority of meters which might be routinely encountered. Moreover, the device also requires removal and replacement of the meter pit cover with its attendant disadvantages in order to perform the intrusive observation of the submerged meter.

Other patents exemplary of various meter reading and other viewing systems include U.S. Pat. No. 1,658,625 issued on Feb. 7, 1928 to Harry W. Ainesworth for an "Attachment for Bulk Containers for Indicating Level of Liquid Contents Therein"; U.S. Pat. No. 1,864,895 issued June 28, 1932 to Willard L. Egy for a "Vernier"; U.S. Pat. No. 2,181,453 issued Nov. 28, 1939 to George B. Gelakoski for a "Gas Meter Reading Scope"; U.S. Pat. No. 2,590,184 issued Mar. 25, 1952 to Theodore Koulomzine for a "Magnetometer"; U.S. Pat. No. 2,738,672 issued Mar. 20, 1956 to Grover H. Smith et al. for "Anti-Fogging Meters"; U.S. Pat. No. 3,612,649 issued Oct. 12, 1971 to Donald M. Pusey for a "Tool for Reading Underground Meters"; and U.S. Pat. No. 4,012,127 issued Mar. 15, 1977 to Lawanda C. Bolander for a "Magnifying Attachment for Telephone Buttons and the Like".

SUMMARY OF THE INVENTION

It is therefore an object of the pressure invention to provide an improved apparatus and method permitting non-intrusive observation of encased indicators.

It is further an object of the present invention to provide an improved apparatus and method permitting non-intrusive observation of encased indicators which can be easily and economically produced, yet sturdy in construction and highly efficient in operation.

It is still further an object of the present invention to provide an improved apparatus and method permitting non-intrusive observation of encased indicators which is lightweight for enhanced portability.

It is still further an object of the present invention to provide an improved apparatus and method permitting non-intrusive observation of encased indicators which may be adapted to read existing meters of various sizes as well as those having existing pit covers.

The foregoing and other objects are achieved in the present invention wherein there is provided an apparatus and method permitting non-intrusive observation from an exterior environment of an indicator encased within an interior environment such as a covered meter pit. The invention comprises, in combination, means for magnifying an aspect of the indicator disposed within the interior environment. Means for optically communicating between the exterior and interior environment are aligned with the indicator and the magnifying means. A sighting duct having proximal and distal portions thereof renders the indicator viewable at the proximal portion of the sighting duct when the distal portion is aligned with the communicating means.

BRIEF DESCRIPTION OF THE DRAWINGS

The above mentioned and other features and objects of the present invention and the manner of attaining them will become more apparent and the invention itself will be best understood by reference to the following description of an embodiment of the invention taken in conjunction with the accompanying drawings wherein:

FIG. 1 is a perspective view of a sighting duct in accordance with the present invention.

FIG. 1A is a cutaway, side-plan view of a sighting duct in accordance with the present invention illustrating a battery-operated illumination source, such as an incandescent bulb useful in viewing an encased indicator under adverse ambient light conditions;

FIG. 1B is a bottom-plan view of the embodiment of the sighting duct of FIG. 1A at its distal portion thereof;

FIG. 2 is a bottom-plan view of a sighting plug at its lower end thereof in accordance with the present invention for providing optical communication through a specially constructed or modified existing meter cover separating an external viewing environment from an encased internal environment, for example, a meter pit;

FIG. 2A is a side-plan view of the embodiment of the sighting plug of FIG. 2;

FIG. 3 is a cutaway side-plan view of a lensholder in accordance with the present invention illustrating a bi-convex lens and circumferentially surrounding pipe for affixation to a meter or indicator face by means of an adhesive ring in alignment with a sighting plug;

FIG. 3A is a top-plan view of the embodiment of the lens holder of FIG. 3 at its upper end thereof;

FIG. 4 is a side-plan view of an embodiment of a meter reading system in accordance with the present invention comprising, in combination, the sighting duct of FIGS. 1A and 1B, the sighting plug of FIGS. 2 and 2A and a cutaway view of the lens holder of FIGS. 3 and 3A for use, for example, with subterraneanly disposed water meters of varying depths in a covered pit defining an interior environment encasing an indicator.

DESCRIPTION OF A PREFERRED EMBODIMENT

With reference to FIGS. 1A and 1B, a sighting duct 10 for use in a meter reading system in accordance with the present invention is shown. Sighting duct 10 comprises, in general, a tube 12 having a proximal portion 14 and opposite distal portion 18 communicating between proximal portion 14 and distal portion 16. Sighting duct 10 may be constructed of lightweight extruded aluminum, plastic or other similar rigid and self-supporting structural tubing.

Eye piece 20 is affixed to proximal portion 14 of tube 12. Eye piece 20, which may comprise a generally circular rubber or elastomeric member provides a conformational seal establishing an essentially ambient light-free engagement of sighting duct 10 to a user's ocular orbit. Resilient endpiece 22 is affixed to distal portion 16 and may comprise a similar rubber or elastomeric member for providing a conformational seal for essentially ambient light-free engagement of sighting duct 10 to a sighting plug as will be more fully described hereinafter.

Sighting duct 10 further comprises an optional illumination source which, in the embodiment shown, comprises incandescent bulb 26. Incandescent bulb 26 is disposed within longitudinal bore generally referred to as reference number 18 of sighting duct 10 and includes a shield 32 for directing its illumination towards distal portion 16 of tube 12 while shading illumination from directly radiating toward proximal portion 14 of tube 12. Incandescent bulb 26 is powered by means of battery 28 secured within battery case 30 on the outer circumference of tube 12. Illumination switch 24 adjacent proximal portion 14 of tube 12 switchably controls application of voltage from battery 28 to incandescent bulb 26 by means of one or more insulated conductors (not shown). Incandescent bulb 26 in conjunction with shield 32 is useful in directing illumination toward an indicator such that light reflected therefrom will travel through longitudinal bore 18 to the eye of a user of sighting duct 10.

It should be noted, that sighting duct 10 should be of sufficient length, to allow a user to observe a subterraneanly disposed indicator when used in conjunction with a meter reading system in accordance with the present invention such that the user need not unnecessarily stoop towards the meter. When utilized in conjunction with alternative embodiments of the invention for non-intrusive observation of an encased indicator, sighting duct 10 may be adjusted in length, L, to afford maximum ease of utilization. For most applications, sighting duct 10 may comprise a tube 12 having a diameter on the order of 1.5 inches.

Referring additionally to FIGS. 2 and 2A, sighting plug 40 is shown for use in a meter reading system in accordance with the present invention. Sighting plug 40 comprises a generally cylindrical shaped member of glass, plastic or other similar rigid, optically translucent material. Sighting plug 40 includes convex dome 42 at upper end 40 thereof. Convex dome 42 may provide magnification of objects viewed therethrough or not depending upon the application of sighting plug 40 in a system for non-intrusive observation of an encased indicator. Convex dome 42 includes circumferential rim 54 and peripheral lip 50.

Sighting plug 40 also includes lower end 48 opposite to upper end 44. A plurality of threads 46 are formed or machined into outer cicumferential surface 56 for affixation of sighting plug 40 to a meter cover as will be more fully described hereinafter. Sighting plug 40 includes light conductive path 52 through its longitudinal axis. Light conductive path 52 may be a void as shown, or a portion of optically translucent material such as that utilized in construction of sighting plug 40. For utilization in a meter reading system in accordance with the present invention, sighting plug 40 may be approximately two inches in length between upper end 44 and lower end 48. Additionally, circumferential rim 54 may have a diameter of approximately two inches while outer circumferential surface 56 has a diameter of approximately one and one-half inches.

Referring additionally now to FIGS. 3 and 3A, lens holder 60 in accordance with the present invention as shown. Lenseholder 60 comprises, in major part, pipe 66 circumferentially surrounding and retaining biconvex lens 70. Pipe 66, which may comprise polyvinylchloride (PVC) plastic or other similarly suitable rigid, self-supporting structural tubing is affixed to, for example, a meter face by means of adhesive ring 68 at meter end 62 of pipe 66. Pipe 66 additionally present upper end 64 opposite to meter end 62. Biconvex lens 70 provides optical magnification of an indicator such as those found in conjunction with a fluid meter. For use with a subterraneanly disposed water meter, lensholder 60 may have a dimension of approximately three inches from meter end 62 to upper end 64. For use in conjunction with such meters, which in some instances can be submerged under water, lens holder 60 should preferably be of sufficient longitudinal dimension to insure that upper end 64 remains above the water level to prevent obscuration of bi-convex lens 70 by water carried debris.

Referring additionally to FIG. 4, a meter reading system 80 is shown. Meter reading system 80 provides an apparatus and method permitting non-intrusive observation of encased indicators, for example, a subterraneanly disposed water or other fluid meter 86 encased within pit 88 having meter cover 82 thereover. Meter reading system 80 includes sighting duct 10 and sighting plug 40 axially aligned with lens holder 60 above an indicator of fluid meter 86. With respect to meter reading system 80 as shown, like structure to that above described with respect to sighting duct 10, sighting plug 40 and lensholder 60 is like numbered and the foregoing description thereof shall suffice hereof. Fluid meter 86, as shown, may be disposed at varying depths within pit 88 having an indicator thereof upwardly disposed. Lenseholder 60 is affixed to an indicator face of fluid meter 86 such that biconvex lens 70 is positioned in a generally parallel and spaced-apart relation thereto. As above described, upper end 64 should extend above the level of any fluid which might be found within pit 88.

Pit 88 is covered by means of meter cover 82 through which is extended sighting plug 40 in alignment with lensholder 60. Sighting plug 40 is secured within an aperture through meter cover 82 by means of nut 54 preferably having threadably engaging threads 46 on outer circumferential surface 56 of sighting plug 40. Meter cover 82 may be an existing meter cover having an aperture bored therethrough for insertion and retention of sighting plug 40 or may be a cover specifically manufactured to replace an existing meter cover 82.

In use, sighting duct 10 is pressed to convex dome 42 of sighting plug 40 such that resilient end piece 22 provides conformational and essentially ambient light-free engagement therewith. By use of sighting duct 10, ambient light or light from an illumination source such as incandescent bulb 26 may be directed through sighting plug 40 and lens holder 60 to illuminate an indicator of fluid meter 86. Light reflected from an indicator of fluid meter 86 is then redirected through lens holder 60, sighting plug 40 and longitudinal bore 18 of sighting duct 10 to a user's eye.

What has been provided therefore is an improved apparatus and method permitting non-intrusive observation of encased indicators which is simply an economically effectuated. The improved apparatus and method of the present invention is lightweight for enhanced portability. Moreover, the improved apparatus and method for permitting non-intrusive observation of encased indicators in accordance with the present invention may be adopted to read existing meters of various sizes as well as those having existing pit covers.

While there have been described above the principles of the invention in conjunction with specific apparatus, it is to be clearly understood that this description is made only by way of example and not as limitation to the scope of the invention.

I claim:

1. An apparatus permitting non-intrusive observation from an exterior environment of an encased indicator within an interior environment comprising, in combination:

means for magnifying an aspect of said indicator disposed within said interior environment, said magnifying means comprises a lens holder means for mounting onto said encased indicator in a spaced-apart relationship to said encased indicator;

means for optically communicating between said exterior and interior environments said communicating means being aligned with said indicator and said magnifying means, said means for optically communicating comprises a sighting sleeve means thereabove said magnifying means;

a sighting duct having proximal and distal portion thereof, said indicator is viewable from said proximal portion at said sighting duct when said distal portion is aligned with said communicating means, said proximal portion has an eye piece integral thereto, said distal portion has a resilient endpiece integral thereto for providing a conformational seal for substantially ambient light free engagement of said sighting duct; and a source of illumination for said indicator having incorporated therein within said sighting duct a battery powered incandescent bulb and further having a uni-directional shield for said source of illumination for directing said illumination towards said distal portion while shading said illumination from directly radiating toward said proximal portion of said sighting duct.

2. The apparatus of claim 1 wherein a lens is disposed within a tube perpendicularly disposed to a plane of said indicator.

3. The apparatus of claim 2 wherein said tube extends above a fluid level contained within said interior environment.

4. The apparatus of claim 1 wherein said indicator is an indicator for fluid flow measuring equipment.

5. The apparatus of claim 1 wherein said interior environment is subterraneanly disposed.

6. The apparatus of claim 1 wherein said communicating means comprises a translucent port.

7. The apparatus of claim 11 wherein said translucent port is made of glass.

8. The apparatus of claim 7 wherein said sighting duct is constructed of a tubular portion of extruded aluminum.

9. The apparatus of claim 8 wherein said distal end further comprises a conformational seal for essentially ambient light-free engagement of said communicating means.

10. The apparatus of claim 9 wherein said proximal end further comprises a conformational seal for essentially ambient lightfree engagement of said sighting duct to a user's ocular orbit.

11. A method for permitting non-intrusive observation from an exterior environment or an encased indicator within an interior environment comprising the steps of:

magnifying an aspect of said indicator, said indictor being disposed within said interior environment, said step of magnifying comprises the step of mounting a lens holder means onto said encased indicator in a spaced-apart relationship to said encased indicator;

furnishing optical communication between said exterior and interior environments and axial alignment with said indicator, said step of furnishing optical communication further comprises the step of mounting a sighting sleeve means thereabove said lens holder means;

providing a sighting duct having proximal and distal portion thereof, said indicator is viewable at said proximal portion at said sighting duct when said distal portion is in axial alignment with said indicator, said proximal portion has an eye piece integral thereto, said distal portion has a resilient endpiece integral thereto for providing a conformational seal for substantially ambient light free engagement of said sighting duct;

illuminating said indicator by an illumination source disposed within said sighting duct, said source of illumination having incorporated therein a battery powered incandescent bulb; and thereafter uni-directionally shielding said illumination source from said proximal portion of sighting duct for directing said illumination towards said distal portion while shading said illumination from directly radiating toward said proximal portion of said sighting duct.

12. The method of claim 11 wherein said step of magnifying is carried out by means of a biconvex lens disposed within a tube in a spaced-apart relationship to said indicator, said tube being perpendicularly disposed to a plane of said indicator.

13. The method of claim 12 wherein said step of furnishing optical communication is carried out by means of a translucent port.

14. The method of claim 13 wherein said step of providing is carried out by means of a tubular portion of extruded aluminum.

15. The method of claim 14 further comprising the step of:
conformationally sealing said distal end of said sighting duct to said translucent port for essentially ambient light-free engagement thereof.

16. The method of claim 15 further comprising the step of:
conformationally sealing said proximal portion of said sighting duct to a user's ocular orbit for essentially ambient light-free engagement thereof.

* * * * *

UNITED STATES PATENT AND TRADEMARK OFFICE
CERTIFICATE OF CORRECTION

PATENT NO. : 4,669,822

DATED : June 2, 1987

INVENTOR(S) : Austin Myers

It is certified that error appears in the above-identified patent and that said Letters Patent is hereby corrected as shown below:

Column 2, line 46, change "pressure" to -- present --

In Claim 7, line 1, change "11" to -- 6 --

Signed and Sealed this

Twenty-seventh Day of October, 1987

Attest:

DONALD J. QUIGG

*Attesting Officer*  *Commissioner of Patents and Trademarks*